(12) United States Patent
Garrigus et al.

(10) Patent No.: US 11,982,388 B2
(45) Date of Patent: May 14, 2024

(54) CONNECTOR ASSEMBLY FOR ADHESIVE DISPENSERS

(71) Applicant: Altenloh, Brinck & Co. U.S., Inc., Bryan, OH (US)

(72) Inventors: Peter Garrigus, Bryan, OH (US); Michael Murry, Wauseon, OH (US)

(73) Assignee: Altenloh, Brinck & Co. US, Inc., Bryan, OH (US)

( * ) Notice: Subject to any disclaimer, the term of this patent is extended or adjusted under 35 U.S.C. 154(b) by 354 days.

(21) Appl. No.: 16/096,791

(22) PCT Filed: Jun. 15, 2018

(86) PCT No.: PCT/US2018/037735
§ 371 (c)(1),
(2) Date: Oct. 26, 2018

(87) PCT Pub. No.: WO2018/232229
PCT Pub. Date: Dec. 20, 2018

(65) Prior Publication Data
US 2021/0131597 A1 May 6, 2021

Related U.S. Application Data

(60) Provisional application No. 62/520,172, filed on Jun. 15, 2017.

(51) Int. Cl.
*F16L 37/252* (2006.01)
*B65D 47/14* (2006.01)
(Continued)

(52) U.S. Cl.
CPC ............ *F16L 37/252* (2013.01); *B65D 47/14* (2013.01); *F16L 33/18* (2013.01); *F16L 33/24* (2013.01)

(58) Field of Classification Search
CPC ....... F16L 37/252; F16L 37/113; F16L 33/18; F16L 33/24; B65D 47/14; B65D 2255/00; B65D 2255/06
(Continued)

(56) References Cited

U.S. PATENT DOCUMENTS 2,147,026 A * 2/1939 Glab ..................... F16L 37/252
4,113,227 A * 9/1978 Cigliano ......................... 285/84
(Continued)

FOREIGN PATENT DOCUMENTS

EP 2987745 A1 2/2016

OTHER PUBLICATIONS

International Written Opinion from corresponding International Application PCT/US18/37735 indicated completed on Aug. 8, 2018.
(Continued)

*Primary Examiner* — Zachary T Dragicevich
(74) *Attorney, Agent, or Firm* — Gardner, Linn, Burkhart & Ondersma LLP (57) ABSTRACT

A connector assembly for an adhesive dispenser is provided and includes a drum fixture seated into a drum containing an adhesive material. The drum fixture is configured for fluid communication with the drum. A hose fixture is connected to the drum fixture and configured for fluid communication with the drum fixture. The hose fixture is configured for insertion and rotation to form the connection with the drum fixture. The hose fixture includes a latch assembly configured to prevent rotation of the hose fixture. A seal member is disposed between the drum fixture and the hose fixture. The seal member is configured to facilitate fluid communication between the drum fixture and the hose fixture. The seal member is configured to prevent leakage of fluid materials between the hose fixture and the drum fixture. The
(Continued)

latch assembly requires manual intervention to remove the hose fixture from the drum fixture.

16 Claims, 5 Drawing Sheets

(51) Int. Cl.
 *F16L 33/18* (2006.01)
 *F16L 33/24* (2006.01)
(58) Field of Classification Search
 USPC .......................................... 285/82, 84, 376
 See application file for complete search history.

(56) References Cited

U.S. PATENT DOCUMENTS

| | | | |
|---|---|---|---|
| 4,643,459 A * | 2/1987 | Carson ................. | F16L 37/252 285/376 |
| 4,832,237 A | 5/1989 | Hurford, Jr. | |
| 5,511,692 A | 4/1996 | Willingham | |
| 6,726,048 B2 | 4/2004 | Dwinell et al. | |
| 6,738,566 B2 | 5/2004 | Pagnella | |
| 6,968,968 B2 | 11/2005 | Buckley et al. | |
| 7,568,585 B2 | 8/2009 | Baughman et al. | |
| 7,690,526 B1 | 4/2010 | Hoff | |
| 8,186,921 B2 | 5/2012 | Lowman | |
| 9,327,308 B2 | 5/2016 | Choiniere et al. | |
| 10,359,140 B2 * | 7/2019 | Flynn ................... | F16L 37/113 |
| 2005/0189380 A1 | 9/2005 | Sweeton et al. | |
| 2008/0084063 A1 | 4/2008 | Hamilton | |
| 2009/0008400 A1 | 1/2009 | Back | |
| 2010/0000998 A1 | 1/2010 | Schütz | |
| 2012/0298063 A1 * | 11/2012 | Schieszl ............... | F16L 37/113 |
| 2013/0284457 A1 * | 10/2013 | Laurel .................. | F16L 37/252 |
| 2014/0332554 A1 | 11/2014 | Haworth et al. | |
| 2015/0314316 A1 | 11/2015 | Kusz et al. | |
| 2016/0273686 A1 | 9/2016 | Considine, Jr. et al. | |
| 2017/0159856 A1 * | 6/2017 | Mitrovich ............ | F16L 37/252 |

OTHER PUBLICATIONS

Images of Buttress Plastiplug with removable center gasket understood to disclose construction of plug publicly distributed and available prior to Jun. 15, 2017.

* cited by examiner

CONNECTOR ASSEMBLY FOR ADHESIVE DISPENSERS

BACKGROUND

This application is the National Stage of International Application No. PCT/US2018/037735 filed Jun. 15, 2018, which claims the benefit of U.S. Provisional Application No. 62/520,172, filed Jun. 15, 2017, the disclosures of which are incorporated herein by reference.

BACKGROUND

In certain situations, it can be desirable to apply a layer of adhesive, such as, for example, a foam adhesive, prior to the laying of subsequent construction materials in place. The adhesive is commonly formed on-site by mixing a plurality of components together. The components are typically supplied in large drums, often containing a quantity of from about 15 gallons to about 55 gallons.

Connectors and connector assemblies can be used to connect the drums with a downstream apparatus, such as the non-limiting example of a hose attached to an applicator. The connectors and connector assemblies are configured to securely attach the downstream apparatus to the drums in a manner that prevents unwanted leakage from the drum/connector interface. In many situations, the connectors and connector assemblies are connected to the drums with mechanical, threaded fittings that make removal of the connectors and connector assemblies difficult and time-consuming, often requiring the use of tools.

It would be advantageous to provide an improved connector assembly for connecting a drum to downstream apparatus.

SUMMARY

It should be appreciated that this Summary is provided to introduce a selection of concepts in a simplified form, the concepts being further described below in the Detail Description. This Summary is not intended to identify key features or essential features of this disclosure, nor is it intended to limit the scope of the connector assembly for adhesive dispensers.

The above objects as well as other objects not specifically enumerated are achieved by a connector assembly for an adhesive dispenser. The connector assembly includes a drum fixture seated into an opening of a drum containing an adhesive material. The drum fixture is configured for fluid communication with the drum. A hose fixture is connected to the drum fixture and configured for fluid communication with the drum fixture. The hose fixture is further configured for insertion and rotation to form the connection with the drum fixture. The hose fixture further includes a latch assembly configured to prevent rotation of the hose fixture after the hose fixture is connected to the drum fixture. A seal member is disposed between the drum fixture and the hose fixture. The seal member is configured to facilitate fluid communication between the drum fixture and the hose fixture. The seal member is configured to prevent leakage of fluid materials between the hose fixture and the drum fixture. The latch assembly requires manual intervention to remove the hose fixture from the drum fixture.

The above objects as well as other objects not specifically enumerated are also achieved by a method of using a connector assembly for an adhesive dispenser. The method including the steps of seating a drum fixture into an opening of a drum containing an adhesive material, the drum fixture configured for fluid communication with the drum, connecting a hose fixture to the drum fixture, the hose fixture configured for fluid communication with the drum fixture, the hose fixture further configured for insertion and rotation to form the connection with the drum fixture, the hose fixture further including a latch assembly configured to prevent rotation of the hose fixture after the hose fixture is connected to the drum fixture and disposing a seal member between the drum fixture and the hose fixture, the seal member configured to facilitate fluid communication between the drum fixture and the hose fixture, the seal member configured to prevent leakage of fluid materials between the hose fixture and the drum fixture, wherein the latch assembly requires manual intervention to remove the hose fixture from the drum fixture.

Various aspects of the connector assembly for adhesive dispensers will become apparent to those skilled in the art from the following detailed description of the illustrated embodiments, when read in light of the accompanying drawings.

DETAILED DESCRIPTION

The connector assembly for adhesive dispensers (hereafter "connector assembly") will now be described with occasional reference to the specific embodiments. The connector assembly may, however, be embodied in different forms and should not be construed as limited to the embodiments set forth herein. Rather, these embodiments are provided so that this disclosure will be thorough and complete, and will fully convey the scope of the connector assembly to those skilled in the art.

Unless otherwise defined, all technical and scientific terms used herein have the same meaning as commonly understood by one of ordinary skill in the art to which the connector assembly belongs. The terminology used in the description of the connector assembly herein is for describing particular embodiments only and is not intended to be limiting of the connector assembly. As used in the description of the connector assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the connector assembly. Notwithstanding that the numerical ranges and parameters setting forth the broad scope of the connector assembly are approximations, the numerical values set forth in the specific examples are reported as precisely as possible. Any numerical values, however, inherently contain certain errors necessarily resulting from error found in their respective measurements.

Figure 1:
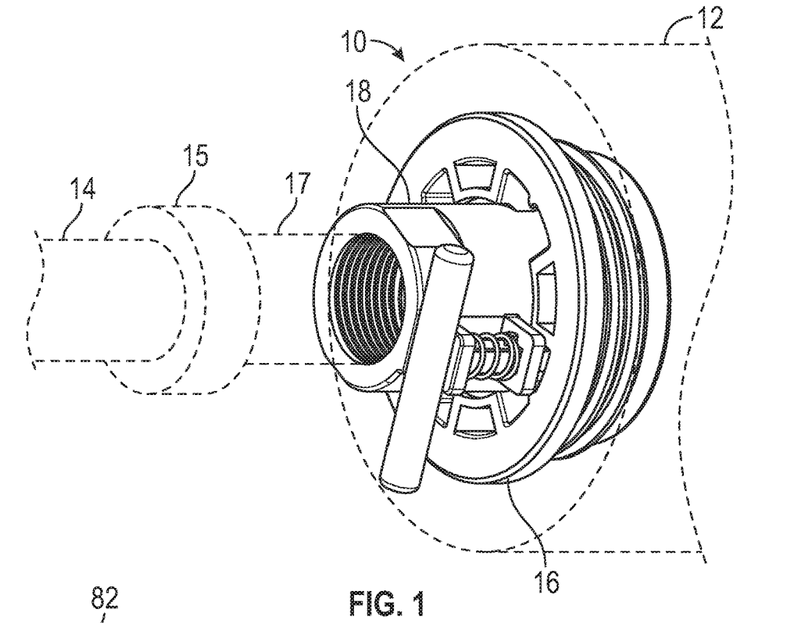
FIG. 1 is a perspective view of a first embodiment of a connector assembly, shown in an installed position with a fluid drum and connected to a dispenser hose.
Figure 2:
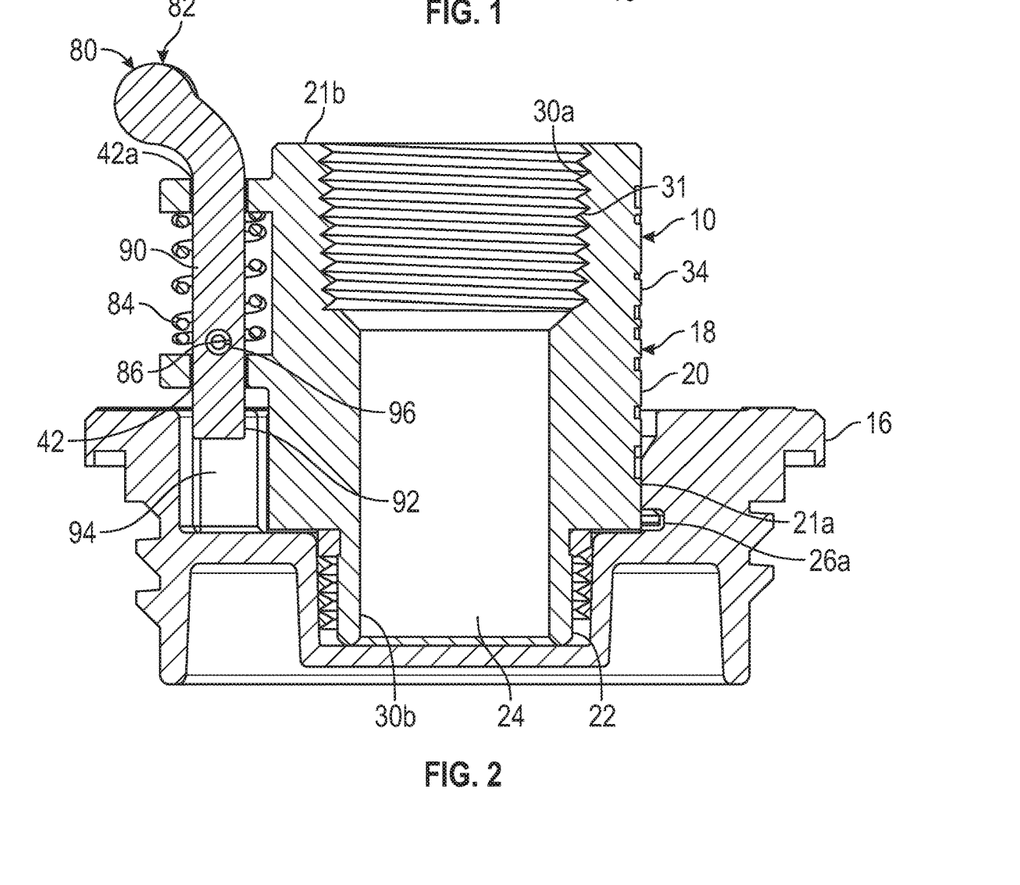
FIG. 2 is a side view, in elevation, of the connector assembly of FIG. 1.
Figure 3:
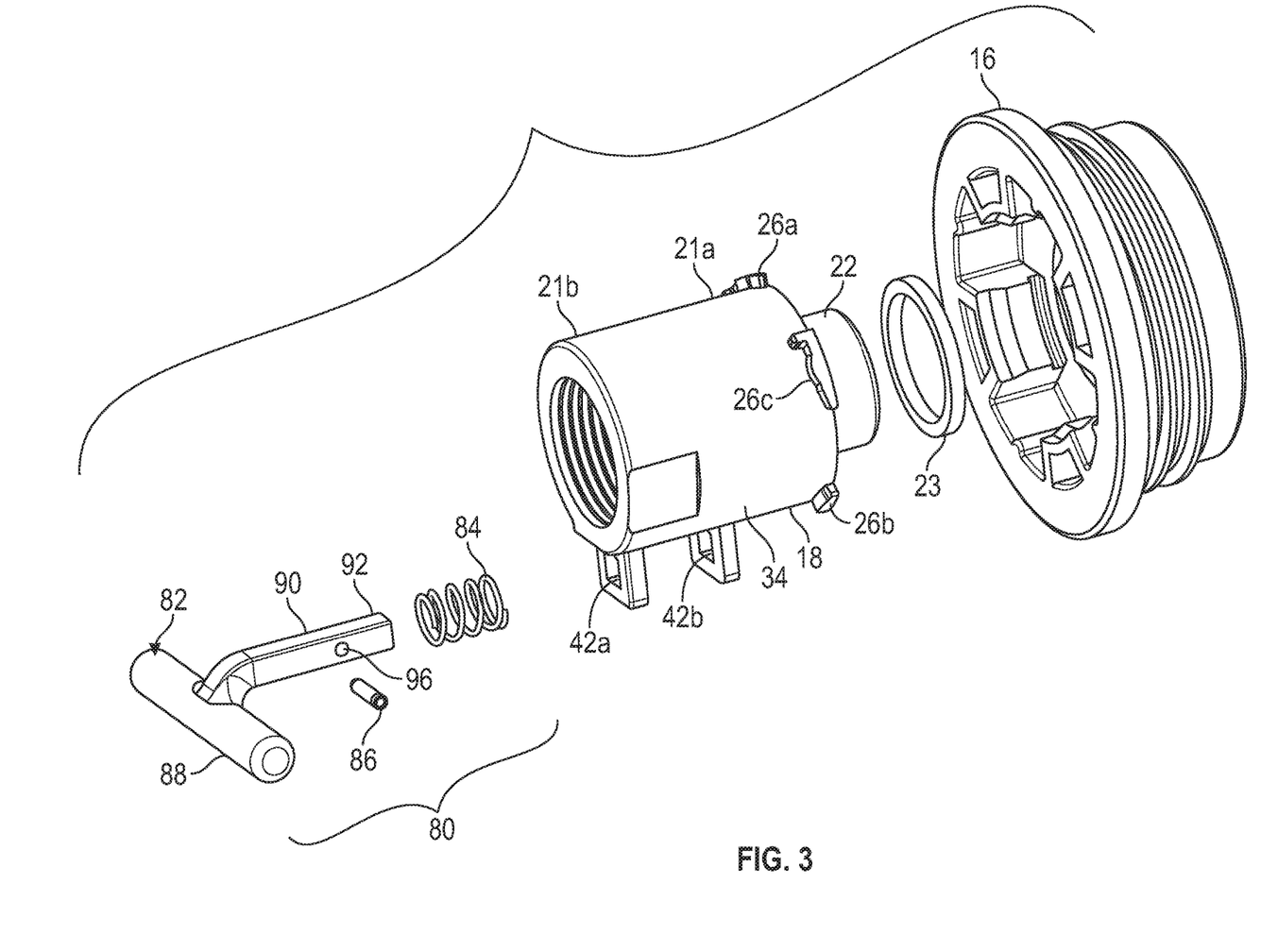
FIG. 3 is an exploded perspective view of the connector assembly of FIG. 1.

Referring now to FIGS. 1-3, a first non-limiting embodiment of a connector assembly is shown generally at 10. The connector assembly 10 is configured to connect a drum containing fluid materials, shown schematically at 12, with a dispenser hose, shown schematically at 14. The connector assembly 10 is also configured to facilitate the flow of the fluid materials from the drum 12 to the dispenser hose 14 while providing a fluid tight seal between the drum 12 to the dispenser hose 14. The connector assembly 10 is further configured to facilitate venting of gases into and out of a vessel. The connector assembly 10 includes a drum fixture 16 and a hose fixture 18. As will be explained in more detail below, the drum fixture 16 and the hose fixture 18 cooperate such that the hose fixture 18 is easily and quickly removed from the drum fixture 16 without the need for special tools.

Optionally, the connector assembly 10 can include a valve assembly shown schematically at 15, such as the non-limiting example of a ball valve, positioned between the dispenser hose 14 and the hose fixture 18. The valve assembly 15 can be fluidly connected to the hose fixture 18 by a connector 17. The valve assembly 15 can be configured to prevent the flow of the fluid materials from the drum 12 to the dispenser hose 14 in the event the dispenser hose 14 is disconnected. It should be appreciated that other types of valves, such as the non-limiting examples of check valves or poppet valves, can be used. The valve assembly 15 can have any desired configuration and/or structure sufficient to prevent the flow of the fluid materials from the drum 12 to the dispenser hose 14 in the event the dispenser hose 14 is disconnected. It should also be appreciated that the valve assembly 15 is optional and not required for operation of the connector assembly 10. While the embodiment of the connector assembly 10 shown in FIGS. 1 and 2 includes a connector 17 configured to connect the valve assembly 15 to the hose fixture 18, in other embodiments the valve assembly 15 can be connected directly to the hose fixture 18, thereby eliminating the connector 17.

Figure 4:
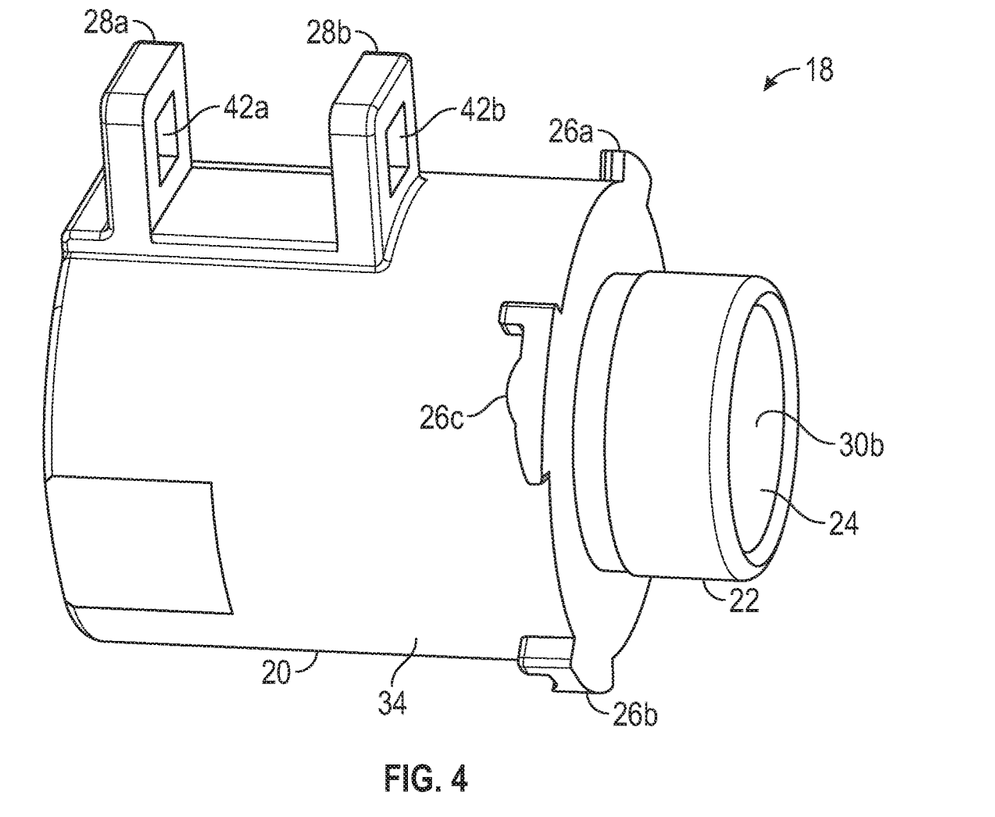
FIG. 4 is a perspective view of a portion of the hose fixture of the connector assembly of FIG. 1.

Referring now to FIGS. 2 and 4, the hose fixture 18 is illustrated. The hose fixture 18 includes a main body 20, an extension segment 22, a seal member 23, an internal passage 24, a plurality of projection members 26a-26d and a plurality of tab supports 28a, 28b.

Referring again to FIGS. 2 and 4, the main body 20 includes a first internal circumferential wall 30a and a second internal circumferential wall 30b. The first and second circumferential walls 30a, 30b cooperate to define the internal passage 24 extending therethrough. The first internal circumferential wall 30a includes an of internal screw thread 31. The second internal circumferential wall 30b has a substantially smooth surface. The main body 20 also includes a first end 21a and a second end 21b.

Referring again to FIGS. 2 and 4, the extension segment 22 extends from the first end 21a of the main body 20 in an axial direction and is configured for insertion into an internal portion of the drum fixture 16. The extension segment 22 includes a portion of the second internal circumferential wall 30b extending therethrough.

Referring now to FIGS. 2 and 4, the internal passage 24 is configured to facilitate the flow of fluid materials from the drum 12 to the dispenser hose 14. In certain embodiments, the internal passage 24 has a circular cross-sectional shape configured to facilitate return of unused fluid materials to the drum 12. However, in other embodiments, the internal passage 24 can have other cross-sectional shapes sufficient to facilitate return of unused fluid materials to the drum 12. An end of the internal passage 24 proximate the second end 21b of the main body 20 is configured for connection to the dispenser hose 14. In the illustrated embodiment, the end of the internal passage 24 proximate the second end 21b of the main body 20 is threaded and configured to receive a threaded fixture extending from the dispenser hose 14. However, in other embodiments, the end of the internal passage 24 proximate the second end 21b of the main body 20 can be configured for other types of connections with the dispenser hose 14.

Referring now to FIG. 3, the extension segment 22 can be fitted with the seal member 23. The seal member 23 is positioned between the extension segment 22 and a portion of the drum fixture 16 and is configured to prevent leakage of fluid materials between the extension segment 22 and the drum fixture 16. In the illustrated embodiment, the seal member 23 has the form of an O-ring. However, the seal member 23 can have other desired forms, sufficient to prevent leakage of fluid materials between the extension segment 22 and the drum fixture 16.

In the embodiment illustrated in FIG. 3, the seal member 23 is formed from a polymeric material, or a combination of polymeric materials, with compression features, such as the non-limiting examples of polyurethane or polypropylene. However, it will be appreciated that the seal member 23 can be formed out of any suitable material, or combinations of materials, sufficient to provide a substantially waterproof seal between the extension segment 22 and the drum fixture 16.

Figure 5:
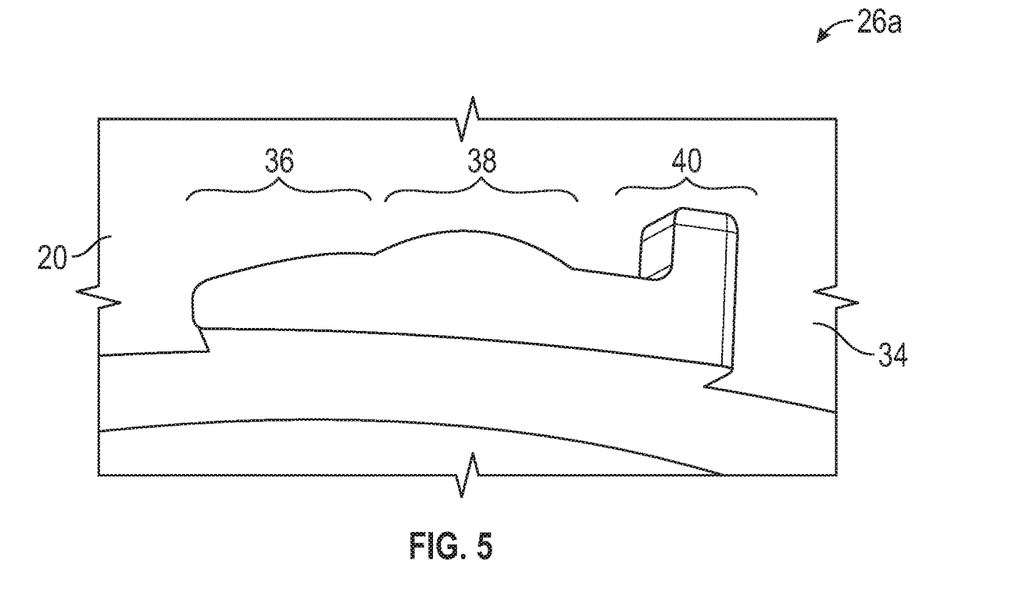
FIG. 5 is a perspective view of a projection of the hose fixture of FIG. 4.

Referring now to FIGS. 2, 3 and 4, the plurality of projections 26a-26d are circumferentially spaced apart about the first end 21a of the main body 20 and extend radially from an outer surface 34 of the main body 20. Referring now to FIG. 5, the projection 26a is illustrated. The projection 26a is representative of the projections 26b-26d. The projection 26a is configured for engagement with portions of the drum fixture 16. The projection 26a includes a first segment 36, a second segment 38 and a third segment 40. The first segment 36 has a sloped profile, increasing in slope in a direction toward the second segment 38 and is configured to engage a corresponding groove in a portion of the drum fixture 16. The first segment 36 is further configured to guide the hose fixture 18 as the hose fixture 18 rotates relative to the drum fixture 16. The second segment 38 is connected to the first segment 36 and includes a raised portion, which is configured to frictionally engage the corresponding groove in a portion of the drum fixture 16 such that the hose fixture 18 seats against and is secured to the drum fixture 16.

Referring again to FIG. 5, the third segment 40 includes an elevated profile. The elevated profile of the third segment 40 is configured to seat against a portion of the drum fixture 16 such as to prevent further rotation of the hose fixture 18.

Referring now to FIG. 4, the hose fixture 18 is illustrated. The tab supports 28a, 28b extend radially from the surface 34 of the body 20. The tab support 28a includes an aperture 42a and the tab support 28b includes an aperture 42b. The apertures 28a, 28b and the tab supports 28a, 28b will be discussed in more detail below.

Figure 6A:
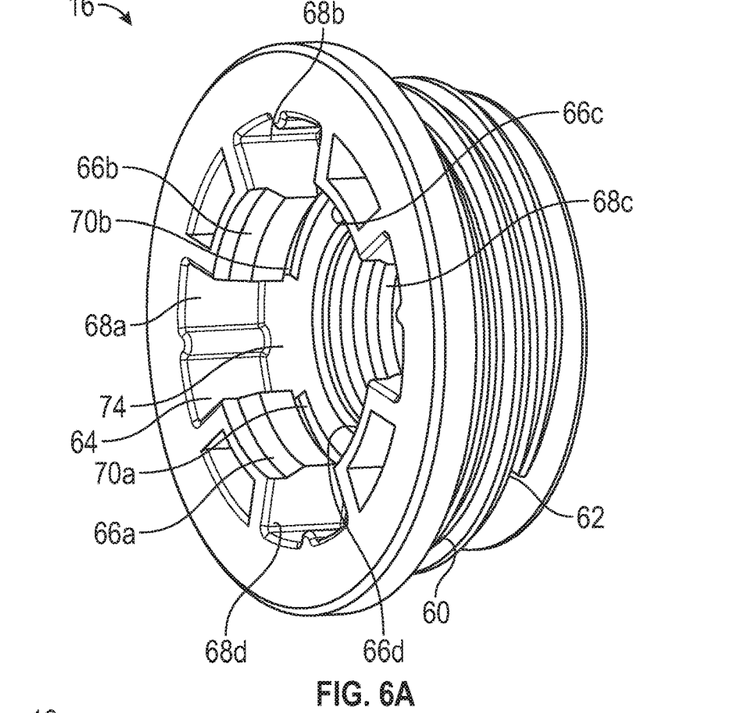
FIG. 6A is a perspective view of a drum fixture of the connector assembly of FIG. 1.
Figure 6B:
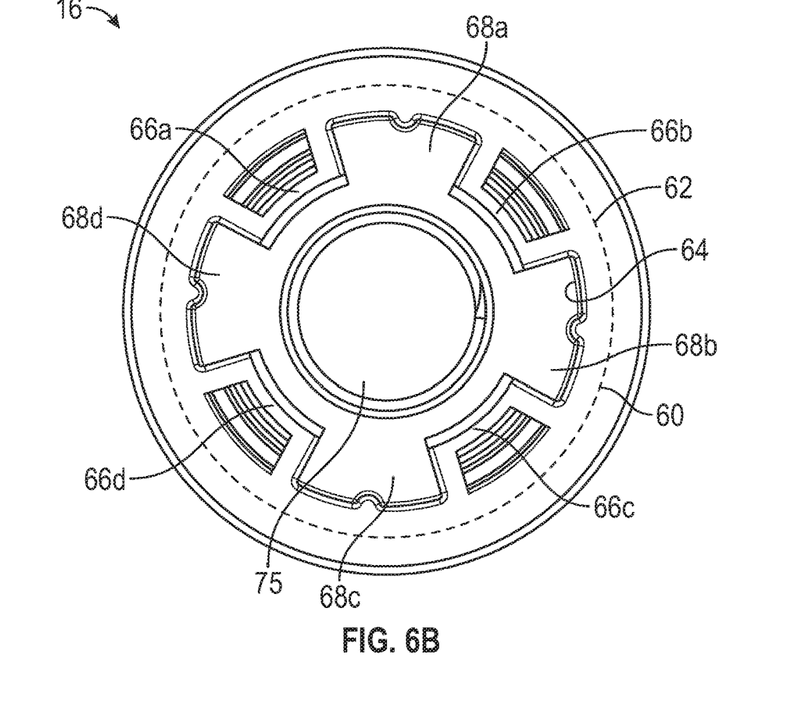
FIG. 6B is a front view of the drum fixture of the connector assembly of FIG. 6A.

Referring now to FIGS. 6A and 6B, the drum fixture 16 is illustrated. The drum fixture 16 is configured for seating against a portion of the drum 12 such that the drum fixture 16 is connected to the drum 12, and further is configured to receive the hose fixture 18. The drum fixture 16 includes a circumferential wall 60 having an outer surface 62 and an inner surface 64. The outer surface 62 includes a threaded portion configured to engage a corresponding threaded portion of the drum 12. However, it is within the contemplation of the connector assembly 10 that the drum fixture 16 can be secured to the drum with other structures, mechanisms and devices.

Referring again to FIGS. 6A and 6B, a plurality of spaced apart projections 66a-66d extend radially inwardly from the inner surface 64 of the circumferential wall 60. A plurality of gaps 68a-68d are formed between adjacent projections 66a-66d. The gaps 68a-68d are configured to receive the circumferentially spaced apart projections 26a-26d positioned on the hose fixture 18 as the extension segment 22 of the hose fixture 18 is inserted into the drum fixture 16.

Referring again to FIGS. 6A and 6B, a groove 70a is formed between a lower surface 72a of the projection 66a and a shoulder 74. In a similar manner, a grooves 70b-70d are formed between lower surfaces 72b-72d and the shoulder 74. As will be explained in more detail below, the grooves 70a-70d are configured to receive the projection members 26a-26d extending from the body 20 of the hose fixture 18.

Referring now to FIGS. 3, 4, 6A and 6B, in operation, the extension segment 22 of the hose fixture 18 is inserted into the drum fixture 16 with the projection members 26a-26d aligned with the gaps 68a-68d. The hose fixture 18 is inserted until the extension member 22 seats against the shoulder 74. Once the extension member 22 is seated, the hose fixture 18 is subsequently rotated in a clockwise direction such that the first segments 36 of the projections 26a-26d engage the grooves 70a-70d in an adjacent projection 66a-66d. As the hose fixture 18 is rotated further in a clockwise direction, the second segments 38 of the projections 26a-26d engage the grooves 70a-70d with an interference fit such as to seat and secure the hose fixture 18 to the drum fixture 16. The hose fixture 18 is further rotated in a clockwise direction until the third segments 40 of the projections 26a-26d seat against a side of the projections 66a-66d. In this manner, the hose fixture 18 can be seated within the drum fixture 16 with a minimal rotation of the hose fixture 18, typically ⅛$^{th}$ of a turn and without the use of special tools. Advantageously, in this manner, the hose fixture 18 is connected to the drum fixture 16 with a pushing and rotating action.

Referring now to FIG. 6B, the drum fixture 16 includes an aperture 75. The aperture 75 is configured to align with and cooperate with the internal passage 24 formed within the hose fixture 18, such as to allow the flow of fluid through the hose fixture 18 and through the drum fixture 16.

Referring now to FIGS. 2 and 3, a latch assembly 80 is illustrated. The latch assembly 80 is configured for several functions. First, in a deployed orientation, the latch assembly 80 is configured to engage a portion of the drum fixture 16 such as to prevent rotational movement of the hose fixture 18. Second, in a retracted orientation, the latch assembly 80 is configured to facilitate rotational movement of the hose fixture 18. The latch assembly 80 includes a t-shaped actuation member 82, a spring member 84 and a retention member 86.

Referring again to FIGS. 2 and 3, the t-shaped actuation member 82 includes a handle 88 connected to a retention arm 90 in a manner such that movement of the handle 88 results in movement of the retention arm 90. In the embodiment illustrated in FIG. 3, the handle 88 has a perpendicular orientation with respect to the retention arm 90. However, in other embodiments, the handle 88 can be connected to the retention arm 90 in other orientations, sufficient that movement of the handle 88 results in movement of the retention arm 90.

Referring again to FIGS. 2-4, the apertures 42a, 42b of the tab supports 28a, 28b are axially aligned and the retention arm 90 has a cross-sectional profile that substantially approximates the cross-sectional profile of the apertures 42a, 42b of the tab supports 28a, 28b such as to allow sliding movement of the retention arm 90 within the apertures 42a, 42b. In the illustrated embodiment, the retention arm 90 and the apertures 42a, 42b have square cross-sectional profiles. However, in other embodiments, the retention arm 90 and the apertures 42a, 42b can have other cross-sectional profiles, sufficient to allow sliding movement of the retention arm 90 within the apertures 42a, 42b.

Referring again to FIG. 2, in an assembled arrangement, the retention arm 90 extends through the apertures 42a, 42b and a lower end 92 of the retention arm 90 seats in a cavity 94, located in one of the projections 66a-66d. Advantageously, once the retention arm 90 is seated in the cavity 94, the latch assembly 80 prevent rotational movement and removal of the hose fixture 18.

Referring again to FIG. 2, the retention member 86 extends through an aperture 96 in the retention arm 90. The retention member 86 is configured to engage the spring member 84, positioned around the retention arm 90, in a manner such that the spring member 84 maintains tension on the retention arm 90 in the seated position. In the illustrated embodiment, the retention member 86 is a roll pin. However, in alternate embodiments, the retention member 86 can be other structures, mechanisms and devices, sufficient to maintains tension on the retention arm 90 in the seated position.

Referring again to FIG. 2, in the event the hose fixture 18 is to be removed from the drum fixtures 16, the handle 88 of the latch assembly 82 is moved in a direction away from the hose fixture 18 a distance sufficient for the lower end 92 of the retention arm 90 to clear the cavity 94. Once the lower end 92 of the retention arm 90 clears the cavity 94, the hose fixture 18 can be rotated until the projection members 26a-26d of the hose fixture 18 aligned with the gaps 68a-68d in the drum fixture 16. At this point, the hose fixture 18 can be removed from the drum fixture 16. Advantageously, in this manner, the latch assembly 80 must be manually retracted to unlock and rotate the hose fixture 18.

Referring again to FIGS. 1-5, 6A and 6B, the connector assembly 10 advantageously provides several benefits over known connectors and valves. First, the connector assembly 10 increases the flow of fluid materials. Second, the hose fixture 18 is easily and quickly connected to the drum fixture 16 without the need for special tools. Third, the hose fixture 18 cannot become disconnected from the drum fixture 16 without manual intervention. Finally, the hose fixture 18 is easily and quickly removed from the drum fixture 16 without the need for special tools.

Figure 7:
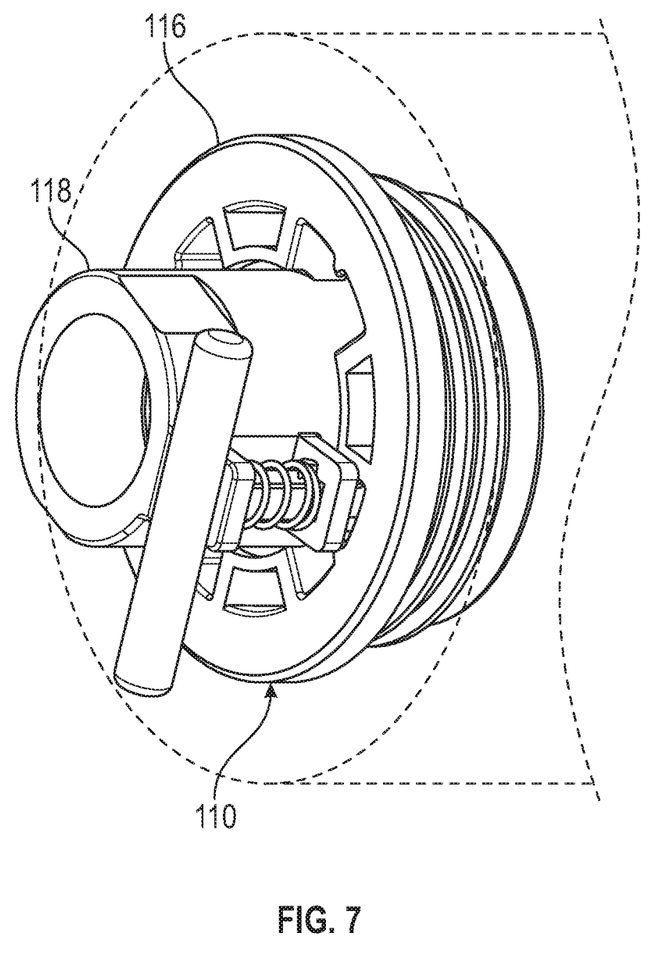
FIG. 7 is a perspective view of a second embodiment of a connector assembly, shown in an installed position with a fluid drum and connected to a dispenser hose.

It is within the contemplation of the connector assembly that other uses can be achieved. Referring now to FIG. 7, a connector assembly 110 is illustrated. The connector assembly 110 includes a drum fixture 116 and a hose fixture 118. In the illustrated embodiment, the drum fixture 116 and the hose fixture 118 are the same as, or similar to, the drum fixture 16 and the hose fixture 18 described above and shown in FIG. 1. However, in other embodiments, the drum fixture 116 and the hose fixture 118 can be different from the drum fixture 16 and the hose fixture 18.

Referring again to FIG. 5, the drum fixture 116 is connected to a drum 112 in the same manner as discussed above. It is contemplated that the connector assembly 110 can be used to vent gases out of the drum 112. It is further contemplated that the connector assembly 110 can be used to vent gases into the drum 112. In certain instances, venting of gases into the drum 112 is accomplished to keep the drum 112 from buckling during evacuation of fluid materials from the drum 112.

While the connector assemblies 10, 110 described above and shown in the Figures have been discussed in relation to drums containing adhesive dispensers, it is contemplated that the connector assemblies 10, 110 can be used with drums containing other materials and other chemicals.

The principle and mode of operation of the connector assembly for adhesive dispensers has been described in certain embodiments. However, it should be noted that the connector assembly for adhesive dispensers may be practiced otherwise than as specifically illustrated and described without departing from its scope.

What is claimed is:

1. An assembly comprising:
   a hollow drum having an interior and a surface having an opening that extends through the surface so as to provide communication with the interior of the hollow drum;
   a drum fixture supported on the drum about the opening, the drum fixture having (1) an aperture that extends therethrough and that defines a circumferential wall and a shoulder, and (2) a plurality of spaced apart projections extending inwardly from the circumferential wall such that (a) a plurality of axially extending gaps is defined between adjacent ones of the plurality of spaced apart projections and the circumferential wall, and (b) a plurality of grooves is defined between adjacent ones of the plurality of spaced apart projections and the shoulder;
   a hose fixture configured to be selectively connected to the drum fixture to be in fluid communication with the drum fixture, the hose fixture structured and configured for axial insertion and rotation relative to the drum fixture to connect the hose fixture to the drum fixture, the hose fixture including a plurality of projection members disposed respectively in the plurality of grooves of the drum fixture when the hose fixture is connected to the drum fixture; and
   a latch assembly supported on the hose fixture and movable between a deployed orientation, wherein the latch assembly extends into the aperture of the drum fixture and engages a portion of the drum fixture to thereby prevents rotational movement of the hose fixture relative to the drum fixture, and a retracted orientation, wherein the latch assembly is retracted from the aperture of the drum fixture and does not engage a portion of the drum fixture to thereby permits rotational movement of the hose fixture relative to the drum fixture for disconnecting the hose fixture from the drum fixture.

2. The connector assembly of claim 1, wherein each of the plurality of spaced apart projections includes a first sloped segment, a second segment extending from the first segment and having a raised portion, and a third segment extending from the second segment and having a raised profile.

3. The connector assembly of claim 1, wherein the hose fixture includes an extension segment configured for insertion into the drum fixture such that in an installed position, the extension segment is adjacent to a shoulder positioned within the drum fixture.

4. The connector assembly of claim 1, wherein the hose fixture includes a plurality of tab supports configured to receive the latch assembly.

5. The connector assembly of claim 4, wherein each of the plurality of tab supports includes an aperture that us configured to slidably receive a retention arm of the latch assembly.

6. The connector assembly of claim 1, wherein the latch assembly includes a retention arm including a lower end configured to seat in a cavity formed in the drum fixture.

7. The connector assembly of claim 6, wherein a retention member is connected to the retention arm and is configured to support a spring member in a manner such that the retention arm maintains tension on the retention arm in the seated position.

8. The connector assembly of claim 7, wherein in the deployed orientation the latch assembly extends into one of the plurality of axially extending gaps.

9. The connector assembly of claim 1, further including a seal member disposed between the drum fixture and the hose fixture, the seal member configured to facilitate fluid communication between the drum fixture and the hose fixture and to prevent leakage of fluid adhesive material between the hose fixture and the drum fixture.

10. A connector assembly for adhesive dispensers comprising:
    a hollow drum having an interior defining an enclosed volume and having an opening that provides access to the interior of the hollow drum;
    a drum fixture supported on the drum about the opening, the drum fixture having an interior comprising a circumferential wall, a plurality of spaced apart projections extending inwardly from the circumferential wall, a plurality of grooves, and an aperture extending through the drum fixture;
    a hose fixture coupled to a hose and configured to be selectively connected to the drum fixture, the hose fixture comprising a longitudinally extending body having an exterior surface and a plurality of projection members extending from the exterior surface, wherein the body is configured for axial insertion and rotation relative to the drum fixture to engage the projection members with the grooves of the drum fixture to connect the hose fixture to the drum fixture; and
    a latch assembly supported on the hose fixture and comprising a retention arm that is movable between a deployed orientation and a retracted orientation, wherein in the deployed orientation the retention arm extends into the interior of the drum fixture to thereby prevent rotational movement of the hose fixture relative to the drum fixture, and in the retracted orientation the retention arm is retracted from the interior of the drum fixture to thereby permit rotational movement of the hose fixture relative to the drum fixture for disconnecting the hose fixture from the drum fixture.

11. The connector assembly of claim 10, wherein the retention arm is moveable in an axial direction relative to the longitudinally extending body.

12. The connector assembly of claim 10, wherein in the deployed orientation the retention arm extends into a gap defined between adjacent ones of the spaced apart projections.

13. The connector assembly of claim 10, wherein one of the spaced apart projections comprises a cavity, and wherein in the deployed orientation the retention arm extends into the cavity.

14. The connector assembly of claim 10, wherein the drum fixture includes a shoulder, and wherein the hose fixture further includes a segment extending from the body, wherein the segment defines a cross sectional distance that is smaller than a cross sectional distance of the body, and wherein the body engages the shoulder of the drum fixture when inserted.

15. The connector assembly of claim 10, wherein the hose fixture includes a tab extending from the exterior surface, and wherein the retention arm is engaged with the tab.

16. The connector assembly of claim 15, wherein the latch assembly further comprises a spring, wherein the spring is engaged with the retention arm to bias the retention arm into the deployed orientation.

\* \* \* \* \*

UNITED STATES PATENT AND TRADEMARK OFFICE
CERTIFICATE OF CORRECTION

| | | |
|---|---|---|
| PATENT NO. | : 11,982,388 B2 | |
| APPLICATION NO. | : 16/096791 | |
| DATED | : May 14, 2024 | |
| INVENTOR(S) | : Peter Garrigus and Michael Murry | |

It is certified that error appears in the above-identified patent and that said Letters Patent is hereby corrected as shown below:

In the Claims

Column 7
Line 58, Claim 1, "prevents" should be --prevent--
Line 62, Claim 1, "permits" should be --permit--

Signed and Sealed this
Eighteenth Day of June, 2024

Katherine Kelly Vidal
*Director of the United States Patent and Trademark Office*